(12) United States Patent
Major

(10) Patent No.: US 12,368,915 B2
(45) Date of Patent: *Jul. 22, 2025

(54) CORRECTING AD MARKERS IN MEDIA CONTENT

(71) Applicant: SLING TV L.L.C., Englewood, CO (US)

(72) Inventor: Robert Drew Major, Orem, UT (US)

(73) Assignee: Sling TV L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/610,101

(22) Filed: Mar. 19, 2024

(65) Prior Publication Data

US 2024/0223829 A1 Jul. 4, 2024

Related U.S. Application Data

(63) Continuation of application No. 18/062,499, filed on Dec. 6, 2022, now Pat. No. 11,979,624.

(51) Int. Cl.
*H04N 21/262* (2011.01)
*H04N 21/234* (2011.01)
(Continued)

(52) U.S. Cl.
CPC ..... *H04N 21/262* (2013.01); *H04N 21/23424* (2013.01); *H04N 21/812* (2013.01); *H04N 21/8455* (2013.01)

(58) Field of Classification Search
CPC ........... H04N 21/262; H04N 21/23424; H04N 21/812; H04N 21/8455; H04N 21/8456; H04N 21/47202
(Continued)

(56) References Cited

U.S. PATENT DOCUMENTS 6,434,195 B1   8/2002   Luthra et al.
8,789,090 B1 *   7/2014   Brueck .............. H04N 21/4305
                                                                       725/35

(Continued)

FOREIGN PATENT DOCUMENTS

CN        101982974 A    3/2011

OTHER PUBLICATIONS

PCT International Search Report for International Application No. PCT/US2023/079331 dated Mar. 20, 2024 (5 pages).
(Continued)

*Primary Examiner* — Cynthia M Fogg
(74) *Attorney, Agent, or Firm* — KW Law, LLP

(57) ABSTRACT

Content is received from a content origin and includes a first I frame occurring in the content at an actual start time of an ad segment. The content includes an ad marker comprising an indicated start time of an available segment, and the actual start time is within a predetermined period of the indicated start time. The ad marker is updated to set the indicated start time equal to the actual start time. The predetermined period may be within 0.5 seconds of the indicated start time. A second I frame may be detected in the content, and a signature may be generated for content at the time of the first I frame. The first I frame corresponds to the actual start time in response to the first I frame occurring before the second I frame and in response to the signature matching a signature of a known ad.

20 Claims, 3 Drawing Sheets

(51) Int. Cl.
*H04N 21/81* (2011.01)
*H04N 21/845* (2011.01)

(58) Field of Classification Search
USPC .......................................................... 725/32
See application file for complete search history.

(56) References Cited

U.S. PATENT DOCUMENTS

| | | |
|---|---|---|
| 11,190,825 B1 | 11/2021 | Grover |
| 11,227,637 B1* | 1/2022 | Collins ............ H04N 21/47205 |
| 2002/0087975 A1* | 7/2002 | Schlack ............ H04N 21/26233 |
| | | 725/35 |
| 2004/0103429 A1* | 5/2004 | Carlucci .............. H04N 21/812 |
| | | 348/E5.002 |
| 2006/0248569 A1 | 11/2006 | Lienhart et al. |
| 2007/0192789 A1* | 8/2007 | Medford ............ H04N 21/8455 |
| | | 725/135 |
| 2013/0216201 A1 | 8/2013 | Seligmann |
| 2014/0150019 A1* | 5/2014 | Ma ....................... H04N 21/458 |
| | | 725/34 |
| 2016/0182922 A1* | 6/2016 | Fonseca, Jr. ...... H04N 21/23424 |
| | | 725/14 |
| 2016/0205443 A1* | 7/2016 | Ghadi .................. H04N 21/812 |
| | | 725/34 |
| 2017/0053676 A1* | 2/2017 | Marchese .............. G11B 27/28 |
| 2017/0214979 A1* | 7/2017 | Menguy ........... H04N 21/23439 |
| 2018/0160196 A1* | 6/2018 | Wahl .................. H04N 21/2668 |
| 2020/0021877 A1 | 1/2020 | Thielen et al. |
| 2021/0084389 A1* | 3/2021 | Young ................ H04N 21/8547 |
| 2021/0195298 A1 | 6/2021 | Percival |
| 2022/0385980 A1* | 12/2022 | Galbraith ........... H04N 21/4335 |

OTHER PUBLICATIONS

Written Opinion of the International Searching Committee for International Application No. PCT/US2023/079331 dated Mar. 20, 2024 (6 pages).

R. Franklin and A. Young, "Out of Band SCTE 35," SMPTE 2017 Annual Technical Conference and Exhibition, Hollywod & Highland, Los Angeles, CA, USA, 2017, pp. 1-11, doi: 10.5594/M001805 (Year: 2017).

* cited by examiner

CORRECTING AD MARKERS IN MEDIA CONTENT

CROSS-REFERENCE TO RELATED APPLICATIONS

This application claims priority to U.S. patent application Ser. No. 18/062,499, filed on Dec. 6, 2022, and entitled "CORRECTING AD MARKERS IN MEDIA CONTENT," which is incorporated herein by reference.

TECHNICAL FIELD

The following discussion generally relates to media signal recognition. Various embodiments may be used in connection with media players, placeshifting devices, digital video recorder (DVR) devices, video game players, or any other devices that transmit or receive streaming media or other digital content over network to correct or insert ad markers.

BACKGROUND

In the past, television viewing typically occurred at home, with one or more family members gathered in front of a television to watch a broadcast program. Television consumption has evolved from CRT screens coupled with an antenna to various viewing devices and delivery systems. Viewers can watch content using phones, tablets, personal computers, set-top boxes, televisions with integrated processing, or video game systems, for example. Additional functions and features have developed as television receivers, media players and other media playback devices become increasingly sophisticated. Modern television receivers, for example, are capable of presenting additional data to accompany television broadcast content, or of taking any number of useful actions to enhance the viewer's enjoyment of their television programming.

While it would be desirable to allow the television receiver to take enhanced actions based upon the content of the advertisements or other portions of the live broadcast, this can prove difficult to implement in practice. In particular, it can be difficult for a cable provider, satellite broadcaster, or other content distributor to know in advance when certain commercials or segments of content will air. Conventional electronic program guides, for example, typically provide information about programming schedules, channel lineups and the like, but may not include accurate or complete markers of content during the broadcast. The timing and identities of commercials present in the broadcast stream or commercial air times are often unidentified or misidentified.

The Society of Cable Telecommunications Engineers (SCTE) develops technology standards related to cable telecommunications engineering. The SCTE 35 standard defines a transport stream for the purpose of digital program insertion indicating to the program distributor where in a stream they can modify the audio/video content. Content is often broadcast with SCTE markers that purport to identify the start location and length of advertisements in a broadcast, but the markers are often inaccurate and thus unreliable.

As a result, content providers can start too early or too late in the broadcast when replacing or modifying advertisements based on SCTE markers alone. Viewers observe the early or late start in the form of overwritten adjacent content. Historically, some broadcasters attempted to mitigate overwritten content by adding a buffer of a few frames before the start and after the end of an ad denoted by SCTE markers. However, the buffer also results in visual artifacts as the buffer results in moments of dead air when not overwritten.

SUMMARY

Various embodiments relate to different automated processes, computing systems, devices, and other aspects of a data processing system executed by a processor to detect ad locations using signatures or I frames proximate ad markers. Content is received from a content origin and detecting a first I frame occurring in the content at an actual start time. The content includes an ad marker comprising an indicated start time of an available segment, and the actual start time is within a predetermined period of the indicated start time. The ad marker is updated to set the indicated start time equal to the actual start time.

Various embodiments set the predetermined period to be within 0.5 seconds of the indicated start time. The steps may further comprise detecting a second I frame occurring in the content within the predetermined period of the indicated start time. The first I frame may be identified as corresponding to the actual start time in response to the first I frame occurring before the second I frame in the content. The first I frame may also be identified as corresponding to the actual start time in response to the first I frame occurring closer to the indicated start time than the second I frame. A signature may be generated for content at the time of the first I frame. The first I frame may be identified as corresponding to the actual start time in response to the first I frame occurring before the second I frame and in response to the signature of the first I frame matching a signature of a known ad.

Embodiments of systems, devices, and processes may perform or include the steps of generating a plurality of signatures of the content, checking each signature from the plurality of signatures against a plurality of ad signatures, and modifying the content to include a second ad marker. The second start time of the second available segment is detected in response to matching signatures. The second ad marker indicates a second available segment beginning at the second start time. The second ad marker may be generated and added to the content. The content including the updated ad marker is transmitted to a client device.

Embodiments include an automated process for execution by a server. The process includes receiving content from a content origin. The content includes an ad segment. A signature is generated for the ad segment. The signature of the ad segment is compared with a plurality of ad signatures to identify a start time of the ad segment. The content is modified to include a new ad marker indicating the ad segment is replaceable beginning at the start time in response to the signature of the ad segment matching an ad signature from the plurality of ad signatures.

In some embodiments, A server includes a processor, a non-transitory data storage and an interface to a network. The non-transitory data storage is configured to store computer-executable instructions that when executed by the processor perform operations. The operations include receiving content from a content origin. The content has an ad marker including an indicated start time of an available segment. The server detects a first I frame occurring in the content at an actual start time within a predetermined period of the indicated start time. The server updates the ad marker to set the indicated start time equal to the actual start time.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the illustrations.

DETAILED DESCRIPTION

The following detailed description is intended to provide several examples that will illustrate the broader concepts that are set forth herein, but it is not intended to limit the invention, application, or uses of the invention. Furthermore, there is no intention to be bound by any theory presented in the preceding background or the following detailed description.

Various embodiments recognize patterns in media content in part based on signatures. The media content is used to generate a simple signature based on the most prominent audio frequencies present in the media content, and the signatures can be analyzed to identify the actual start and end times of advertisements despite ad markers (e.g., SCTE cues) that may incorrectly identify the start or end of an advertisement. This allows for accurate placement of advertisements in real-time or near-real-time. Embodiments also detect the start time or end time of ads by identifying an ad marker and identifying an I frame before or after the marker location.

According to various embodiments, audio signal identification techniques are used to identify the start time and end time of advertisements. Advertisements or other portions of interest can be effectively and quickly identified in a content stream by matching identified audio signals. Signal analysis to generate content signatures can be performed on a network of resource-constrained devices in communication with centralized servers. The content identification is performed by a centralized server by comparing known content signatures with signatures generated an incoming signal. Some embodiments thus detect actually-broadcast content before the content is consumed, when the information can still be used to enhance the viewer experience. Such identification completed using distributed viewing devices and a centralized content aggregator tends to be more reliable, more flexible, and faster than prior techniques.

Analysis of SCTE 35 markers in incoming signals may also be applied to identify the start time and end time of advertisements. Signal identification techniques outlined above may be applied to detect an actual advertisement start or end time occurring near an SCTE marker in some embodiments. An I frame occurring near an SCTE marker may be used as an actual start time, and the duration may be added to the actual start time to determine an actual end time in various embodiments. Identifying an actual start time or end time of an advertisement enables content providers to accurately replace content identified by SCTE markers without introducing audio or visual artifacts due to inaccurate or time shifted SCTE markers.

Figure 1:
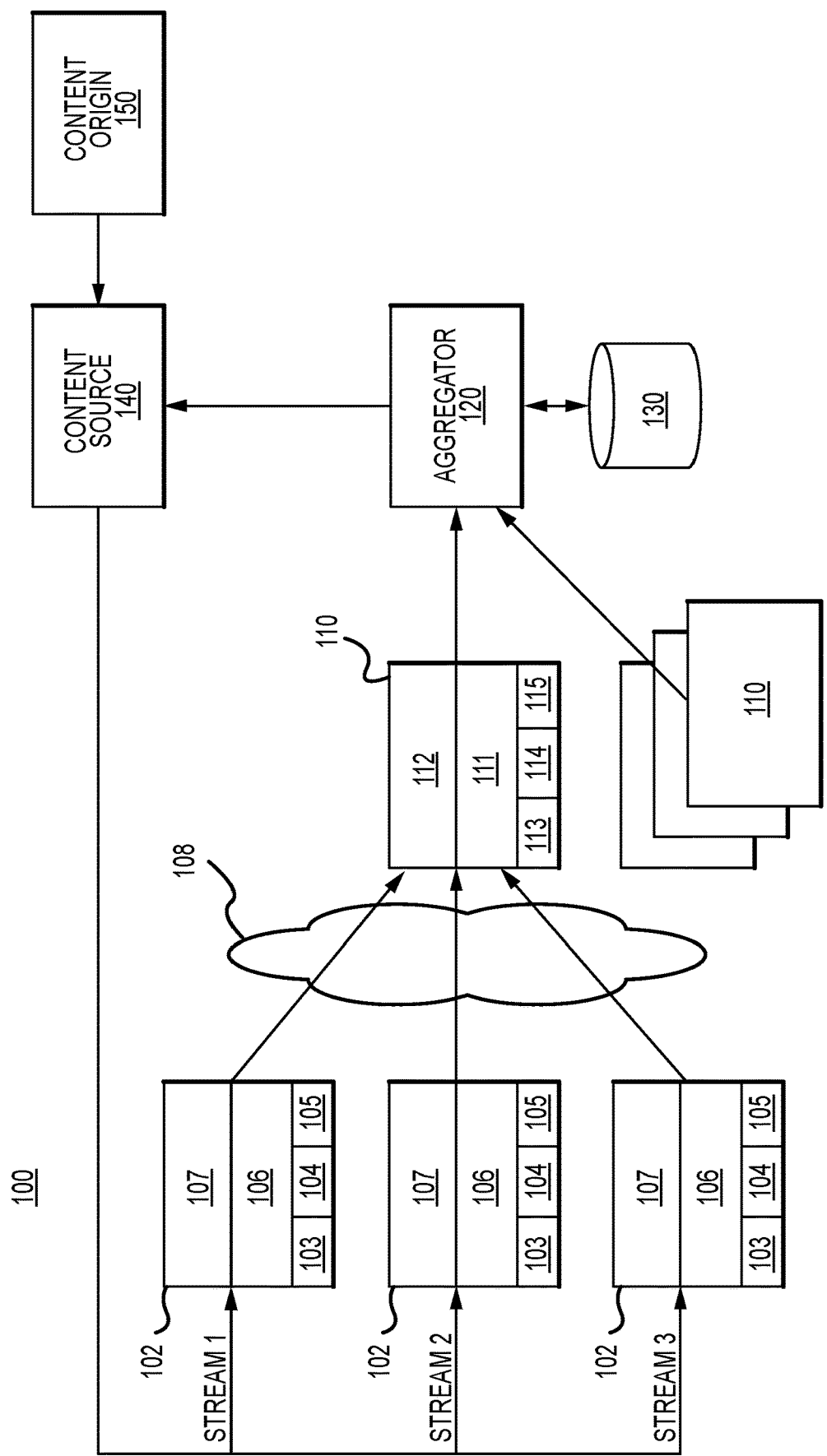
FIG. 1 illustrates an example of a system for detecting advertisements, in accordance with various embodiments.

With reference to FIG. 1, an example system 100 for recognizing media content is shown according to various embodiments. System 100 includes a client device 102 in communication with a server 110 over network 108. Network 108 may include a wide area network (WAN) such as the Internet, a telephony network, a public or private network of any sort, a cellular network, or the like. Network 108 can be based upon TCP/IP protocols, or any other protocols as desired, including any protocols subsequently developed. Equivalent embodiments may integrate device location of client device 102 or streaming via local area networks.

Client device 102 can be any device capable of communicating on network 108 to send signatures or metadata to server 110. For example, client device 102 may be a mobile phone, tablet, computer, television, smart speaker, soundbar, or a similar device communicating on network 108. Client device 102 includes hardware (e.g., processor 103, memory 104, input/output interfaces 105, permanent storage, bios, and the like) and an operating system 106 capable of supporting a signature identification application 107. Signature identification application 107 may include logic for media decoding, sequencing, rendering, processing, or the like.

In some implementations, client device 102 is a home-type server such as a local storage digital video recorder (LSDVR), placeshifting device, remote storage digital video recorder (RSDVR), or other media server device. One example of client device 102 suitable for use in some implementations could be the AirTV Classic device that is available from http://www.airtv.net, although equivalent embodiments could be used with any number of other DVRs, media receivers/players, video on demand (VOD) servers, set top boxes, video game consoles, time or place shifting devices, computers, tablets, smartphones, or the like. U.S. Pat. No. 7,795,062 provides additional detail about several examples of place shifting devices and techniques, and is incorporated by reference herein for any purpose.

In various embodiments, signature identification application 107 and its various components are implemented using software or firmware logic that is stored in memory 104 for execution by processor 103. Equivalent embodiments could use other computing structures and systems to implement similar features as desired. Client device 102 transmits signatures to server application 112 running on server 110.

Servers 110 are network devices having conventional hardware such as a processor 113, memory 114, and input/output interfaces 115 (e.g., a network interface), and an operating system 111 running server application 112 having various processing routes and modules. Server 110 may be a standalone server, virtualized server, distributed computing cluster, container, networked computing devices, or other computing resources capable of communicating with client device 102 over network 108. Server 110 may be running one or more instances of server application 112 on operating system 111. Multiple instances of server 110 may be spun up and running in virtualized or distributed environments in response to high computing loads. Servers 110 run multiple applications that are ancillary to audio signal recognition as described herein. The various instances of server application 112 are in communication with client devices 102 to receive signatures of media content.

Client devices 102 receive media from content provider 140 or other media sources. For example, a suitable media source may be a local storage device formatted to include a database of media content, a file server, a cloud storage system, a content delivery network (CDN), a television broadcaster, a video game device, a social media platform, an online video repository, a time or placeshifting device, or the like. Media content includes an audio component and may optionally include a video component, as signatures described herein are generated primarily based on audio signals.

In various embodiments, content provider 140 may be a satellite, cable, or streaming provider that delivers content from content origin 150. Content origin 150 may be television networks or broadcasters or other media creators. Content origin 150 annotates content delivered to content provider 140 with ad markers (e.g., SCTE cues) to indicate where content can be modified by downstream recipients. For example, the ad markers may indicate that content provider 140 can replace an advertisement block within the content transmitted from content origin 150 to content provider 140.

The media content delivered to client devices 102 is selectable by input on client device 102. Suitable content includes time or place shifted video, video on demand, over-the-air broadcasts, satellite broadcasts, video streams, or other media content for selection and display on client devices 102. Client devices 102 can also tune to broadcast channels to view scheduled programming in some embodiments. For example, stream 1 may be a television channel broadcast by satellite, stream 2 may be a television channel broadcast over network 108, and stream 3 may be an over-the-air broadcast.

Equivalent concepts could be implemented in any number of other devices or systems. Client devices 102 are spread across different geographic regions and configured to analyze media content to generate signatures. The signatures are representations of the media content in the frequency domain. For example, the signature may be set of amplitude coefficients over a frequency domain comprising predetermined frequency bins. The signature is made up of pairs of frequency and magnitude for a predetermined number of largest magnitudes. Any number of frequency-magnitude pairs may be used if the number of pairs is suitable to serve as a signature for an audio signal (e.g., 1, 2, 3, 4, 5, 6, 7, 8, 9, 10). In an example embodiment, the signature comprises the set of the five frequency-magnitude pairs having dominant magnitudes (i.e., the 5 largest magnitudes) detected in a segment of media content. Including a greater number of frequency-magnitude pairs in a signature tends to yield more accurate results compared to embodiments that include fewer frequency-magnitude pairs in a signature.

Client devices 102 may also transmit metadata to server application 112 related to the signatures in some embodiments. Metadata can include a source channel, source IP address, source port, source name, timestamp, geolocation, internet service provider, device identifier, or other metadata suitable for identifying the source, location, and time the media content was replayed or recorded. Metadata assists in identifying the content associated with a signature.

In some embodiments, server 110 is in communication with content provider 140 to prepare content for consumption by end users. Content provider 140 can deliver content on the Internet or another network 108 as part of an RSDVR, VOD or other media streaming service. A media player application executing on one or more client devices 102 may include logic to select content as needed to obtain and playback the media programs of stream 1, stream 2, stream 3 or other media. Content may be readily routable on network 108 and may be served by conventional CDN or other web-type servers, thereby providing a convenient mechanism for distributing media streams to a variety of different client devices 102 on network 108.

Again, other embodiments may use various encoders for encoding cable television signals, DBS signals, or the like. Still other embodiments may omit the encoding function entirely and perform audio fingerprinting and recognition separately from the distribution function. Various embodiments may realize substantial benefits by integrating the identification information obtained from audio fingerprinting into content management data.

Audio signatures may be collected in real time as the program streams are received at client devices 102, thereby allowing for rapid identification of then-current broadcast content. This information may be readily incorporated into electronic program guide (EPG) data or other content management data that is provided to the television receiver or other playback device.

In some embodiments, a content management system is included in content provider 140 using conventional processors, memory, storage, and input and output features commonly associated with data processing systems, including any sort of cloud-based resources. Many content aggregators currently use content management systems to manage and distribute electronic program guide (EPG) data and other information about the programs distributed within system 100. These systems may be expanded to process information relating to advertisements or other portions of the content stream, or to associate actions to be performed by the viewer or the playback device based on the content of the stream.

The content provider 140 delivers the content in stream 1 and stream 2 to client devices 102. Client devices 102 can also receive stream 3 or other streams from other sources such as, for example, streaming services, on-demand services, over-the-air broadcasts, recorded content, web content, or other content sources. The stream content may be modified in response to signature data received by servers 110 from client devices 102. Signature data may thus be used in a feedback loop to modify content consumed in the future.

Although some implementations may incorporate conventional EPG data (e.g., data obtained from a vendor or other source), the system 100 may operate absent metadata describing the stream associated with a signature received from a client device 102. Various embodiments use channel and time data associated with a stream in correlating signature data received from client device 102 with known programing, advertisements, or other content. Advertisements, for example, could be referenced by their channel and broadcast time so that additional actions unique to those advertisements could be enabled.

Client device 102 extracts programming signals from the incoming streams and analyzes the audio components of the signals to generate signatures. Client device 102 analyzes the audio signal associated with an incoming content stream in overlapping windows having a predetermined window interval. For example, client device 102 may continuously sample incoming audio data in windows having a window interval of 100 milliseconds (ms). The starting time of consecutive windows are staggered or shifted relative to one another by a predetermined shift interval. Consecutive windows may have start times shifted in increments of 25 ms, for example. Suitable window intervals may range from 5 ms to 500 ms, from 20 ms to 150 ms, from 50 ms to 150 ms, or any other desired interval.

The shift interval is typically shorter than the window interval. Consecutive windows thus have their start times staggered by a shift interval such that consecutive windows include overlapping sections of the programming signals. A shift interval of 25 ms and a window interval of 100 ms would result in consecutive windows overlapping by 75 ms.

The shift intervals for consecutive windows may be 5 ms, 10 ms, 15 ms, 20 ms, 25 ms, 30 ms, 35 ms, 40 ms, 45 ms, or 50 ms, or any other desired shift interval. The shift interval of consecutive windows may be less than the window interval to limit data loss. The shift interval of consecutive windows may be greater than the window interval such that consecutive windows do not overlap. A shift interval greater than the window interval may tend to conserve computing resources with an increased risk of data loss.

Client devices 102 analyze each window to identify pairs of magnitudes and frequency bins representative of the audio signal in the window. The frequency bins may be predetermined based on the sampling rate applied by client device 102. For example, suitable sampling rates may include 2 kilohertz (kHz), 4 kHz, 8 kHz, 16 kHz, 32 kHz, 48 kHz, 64 kHz, or 96 kHz. Continuing the foregoing example, the above sampling rates applied in a sampling interval of 100 ms would result in sample quantity (N) of 200, 400, 800, 1600, 3200, 4800 6400, or 9400 samples per window. Sampling rates and window intervals are predetermined to enable pre-computation of window functions for the sample quantity N.

Window functions are precalculated and stored in lookup tables as weighted multipliers in various embodiments. Window functions are applied at client device 102 by performing a lookup and multiplying an input value by the weighted multiplier. Window functions based on trigonometric functions suitable for use by client device 102 include Hamming windows, Hann windows, Nuttall windows, Blackman windows, flat top windows, or Rife-Vincent windows, for example, although other window functions may be used in various embodiments. The window functions may be stored in lookup tables having N rows for each selected sampling quantity N. The fixed sampling quantity enables pre-calculation of the desired window function.

Client device 102 also stores precomputed values including factors, remainders, and n-so-far values for each sampling quantity N. The Chinese Remainder Theorem may be used to calculate factors in various embodiments. The precomputed values are used in selecting the optimized discrete Fourier transform (DFT) functions for use with the selected sampling rates and window intervals resulting in the selected sampling quantity N.

Computing device 102 applies an optimized DFT for each precalculated value for sample quantity N. Computing device 102 uses lookup tables to limit the DFT math operations used at client device 102 to a subset of multiplication, division, addition, subtraction, and value lookups. For example, a lookup table may contain sine, cosine, or other trigonometric function values for the precalculated factors of the sampling quantity N so that computing device 102 can conserve resources that would be used calculating trigonometric functions in real-time. Some computing devices 102 with limited computing power use fixed point integers to perform the DFT. The word size used by computing device 102 may be 16 bits, 32 bits, or 64 bits. In a 32-bit example, the 10 least significant bits of a floating-point integer may be used to represent the decimal value, and 22 bits of the 32-bit word may be used to represent the whole number component of a value.

In various embodiments using fixed point integer multiplication, values are shifted after the multiplication function is applied. Each multiplication product is divided by 210 to shift the values in the 32-bit example. The end value is divided again by 210 to adjust the value into a readable floating-point integer. Multiplication products are also rounded to the half bit if set.

In various embodiments, the output from each DFT has a real component and an imaginary component associated with a frequency bin. Each frequency bin has a corresponding output magnitude based on the real component and the imaginary component. Computing device 102 may also implement a square root function using a lookup table in calculating magnitude values. A square root function implemented on computing device 102 can also be a native fixed-point integer square root function. Magnitude is equal to the square root of the sum of the real component squared plus the imaginary portion squared. The combination of the magnitude and corresponding frequency bin forms a frequency-magnitude pair for each frequency bin.

The signature of an analyzed window is made up of dominant frequency-magnitude pairs. The term dominant as used in association with magnitudes refers to the magnitudes having the greatest values. The signature is thus made by selecting a predetermined number of frequency-magnitude pairs that have the largest magnitude values (e.g., largest 3 magnitudes, largest 4 magnitudes, largest 5 magnitudes, or largest 6 magnitudes). For example, the signature may comprise five dominant frequency-magnitude pairs (i.e., the five frequency-magnitude pairs with the largest magnitude values) detected in a window.

Client device 102 transmits the signature of the windows of media content to server-side devices (e.g., server 110, aggregation server 120, or content provider 140) for analysis. The signature data (e.g., the set of dominant frequency-amplitude pairs) can be compared to signature data previously stored in a database 130 to identify portions of known content in the program stream. Commercials, for example, can be recognized when the audio component of the stream 1 contains a same or similar signature to known signatures of advertisements stored in database 130. The signatures stored in database 130 may be obtained from human data entry, from a content source (e.g., an advertiser, broadcaster or network), from client devices 102, from servers processing streams, or from any other source as desired. Database 130 may make use of conventional database software (e.g., database products available from Microsoft, IBM, Oracle or any other vendor), or the database 130 may be a custom database developed to store audio signature data, as desired. Database 130 may include structured or unstructured datastores. Database 130 may reside on the same computing hardware as server 110, aggregation server 120, or content provider 140 or on separate computing resources.

System 100 is able to identify advertisements or other contents of the received television broadcasts using audio signatures. Audio signatures may be collected or analyzed in parallel with the encoding stream 1, stream 2, or stream 3 for consumption on a digital network. In some implementations, audio signature analysis and content identification are also performed in parallel for multiple channels that may be simultaneously received by server 110, aggregation server 120, or other devices for any purpose. Signature generation and matching are described in greater detail in U.S. patent application Ser. No. 17/827,211, which is incorporated herein by reference.

Figure 2:
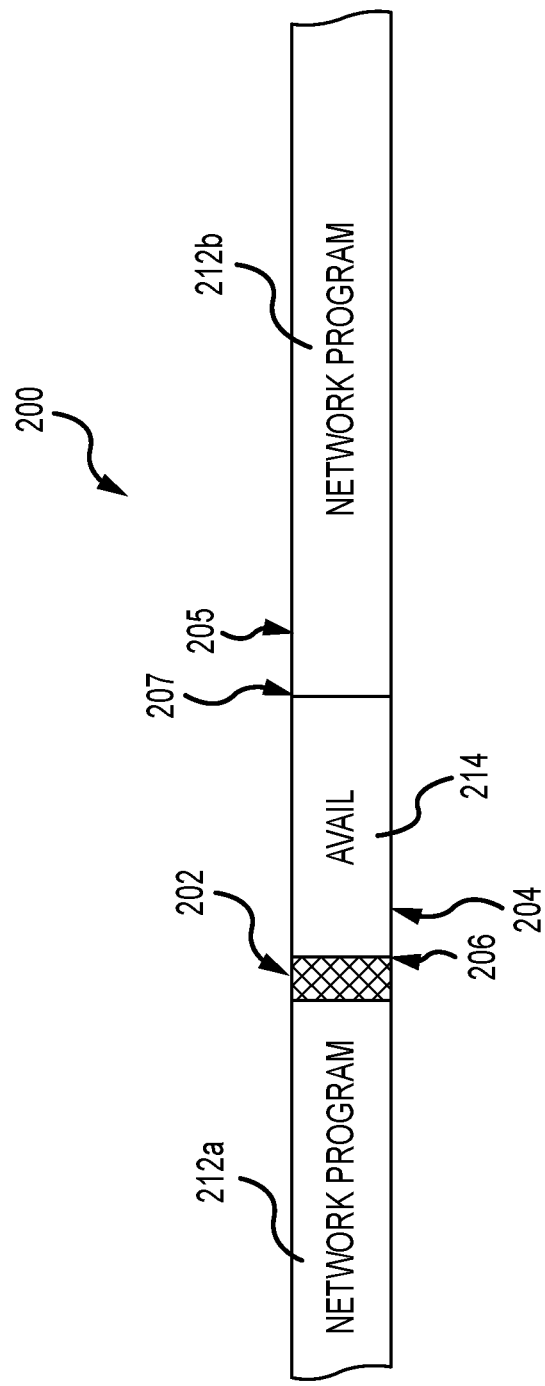
FIG. 2 illustrates an example of a programming stream including ad markers indicating a period available for modification, in accordance with various embodiments.

Referring now to FIG. 2 with continuing reference to FIG. 1, an example of content 200 having ad markers (e.g., SCTE cues) is shown, in accordance with various embodiments. The content 200 is sent from content origin 150 to content provider 140 and to client devices 102. Content 200 may include ad markers indicative of sections of content 200 suitable for editing by content provider 140. For example, content 200 may be an MPEG-2 transport stream having embedded advertisement insertion cues in accordance with the SCTE 35 standard.

SCTE 35 is a broadcast standard that pertains to digital program insertion (DPI) in broadcasts. It describes the in-stream insertion of cue tones in MPEG streams to indicate that modification of content 200 by splicing and insertion is appropriate for insertion of ads or other content. Content 200 may include ad marker 202 (e.g., an SCTE 35 cue) that includes a presentation time stamp (PTS) field for addressable insertion. Ad marker 202 indicates to the content provider 140, client device 102, or any other device receiving content the indicated start time 204 and indicated end time 205 of available section 214, which enables receiving devices to modify the available section 214 of content 200.

Some embodiments of system 100 realign ad markers with the content stream. Currently video streams received from origin sources sometimes include digital markers according to ANSI/SCTE-35 standards indicating an ad is suitable for replacement. The digital markers indicate when an ad break should occur (e.g., "ad break coming up in four seconds"), but the markers are sometimes inaccurate or incorrect. Inaccurate or incorrect markers can result in broadcasting artifacts perceived by the end user such as, for example, a few frames of a replaced ad remaining in the stream before the replacement ad is played. System 100 may detect the actual break time using the signature collection stored in database 130 and analysis techniques described herein, thereby improving the user experience. Detected actual start and end times are used to accurately replace ads with otherwise inaccurate markers.

In various embodiments, the content leaves content origin 150 with markers in the stream indicating locations where others can insert adds or otherwise modify the stream. However, the video delivery path sometimes strips markers. For example, sometimes broadcast channels lack markers when received by the distributer. The signal at the origin may then be synchronized with the broadcast signal that arrives sometimes a few seconds later. The matched ad locations may be used to insert markers at reconstituted locations. In that regard, signal matching techniques described herein may be used to synchronize different streams of the same channel. System 100 can detect and replace desired advertisements in a content stream without referring to markers that may be missing or inaccurate in the original content stream.

In the example of FIG. 2, content 200 includes a broadcasting stream having an available slot 214 disposed between network program portions 212a, 212b. Ad marker 202 indicates timing, such as a specific frame or PTS in the received program content 200 in a stream, broadcast, or other form of transmission, where receiving devices can insert content into the available section 214. During a live broadcast, content provider 140 or client devices 102 analyze content 200 for ad marker 202. Ads would typically be inserted beginning at indicated start time 204 in response to ad marker 202. An ad marker would typically indicate how long available section 214 continued after indicated start time, which results in indicated end time 205 being misplaced relative to actual end time 207.

In various embodiments, system 100 identifies an actual start time 206 and end time 207 of the available slot 214 in response to detecting insertion cue 202. Insertion cue 202 indicates that available slot 214 begins at an indicated start time 204 and continues until indicted end time 205. Indicated end time 205 is identified by a duration after indicated start time 204 in some embodiments, such that indicated end time 205 equals indicated start time plus the duration. However, indicated start time 204 may be shifted from actual start time 206. Similarly, indicated end time 205 may be shifted from actual end time 207. The example of FIG. 2 is illustrative of one type of misaligned ad marker, though the indicated start and end times may appear in content 200 before or after the corresponding actual start and end times.

Figure 3:
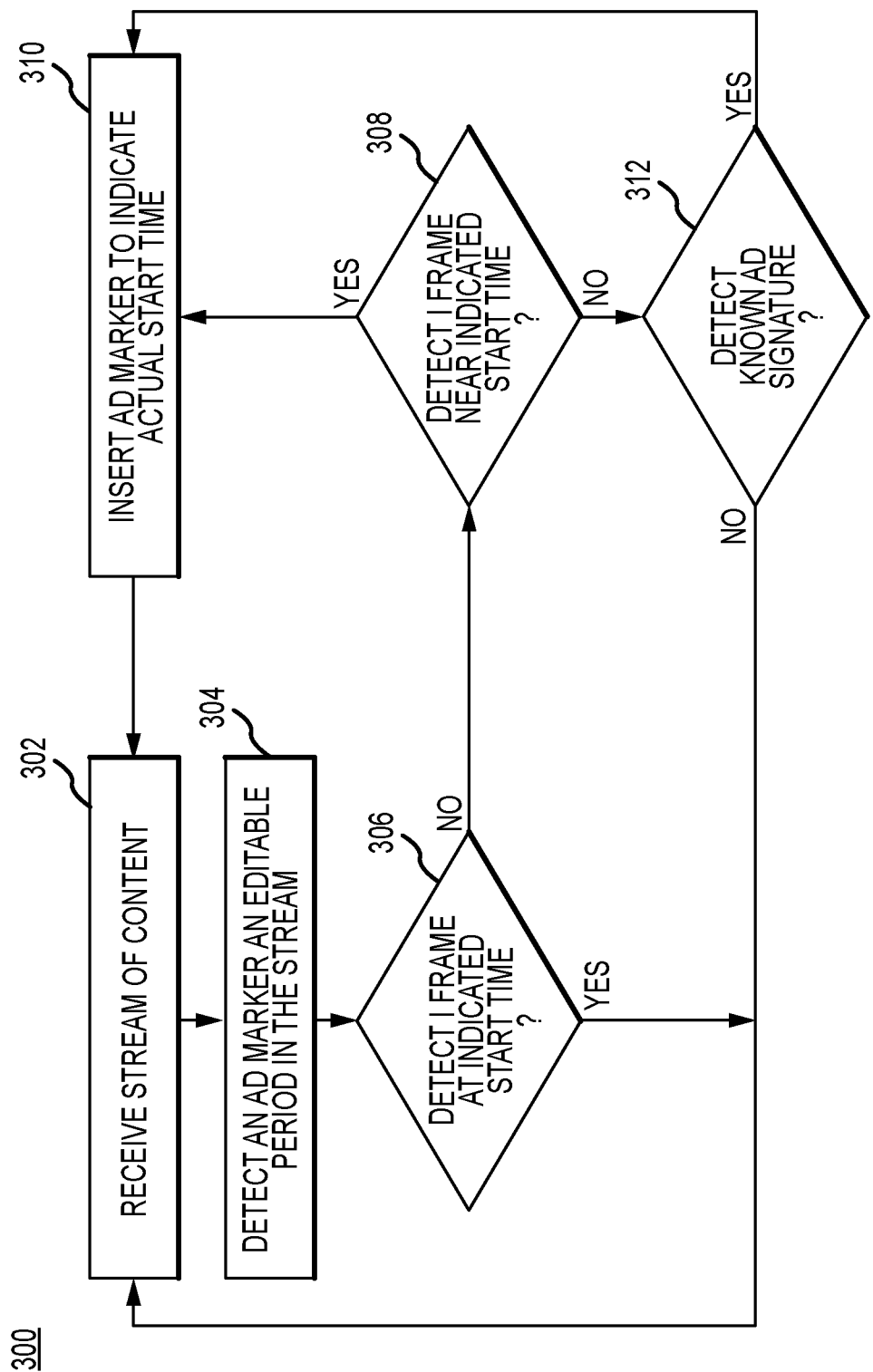
FIG. 3 illustrates an example process for analyzing programming streams to correct the location of ad markers, in accordance with various embodiments.

With reference to FIG. 3 and continuing reference to FIG. 2, process 300 is shown for correcting ad markers 202 in content 200, in accordance with various embodiments. Process 300 may be run at content provider 140 or client devices 102 or FIG. 1. Using content provider 140 as an example, process 300 includes content provider 140 receiving a stream of content 200 (Block 302). The stream includes ad marker 202 that indicates an editable section of content 200. The editable section is an advertisement in some embodiments, though the markers could signify other replaceable sections in content 200. Content provider 140 detects ad marker 202 in content 200 indicating an identified start time 204 (Block 304) of an editable period in content 200.

Some embodiments analyze content to detect an I frame appearing at or near an ad marker. An I frame is a type of frame used in video encoding that includes all of the data necessary to render or create a visual image without additional information. Other forms of frames such as P frames and B frames are incremental and typically rely on reference to a neighboring frame during decoding. I frames tend to occur at scene changes in content streams. Ad marker 202 may also indicate identified end time 205 by including an editable duration after start time 204.

In various embodiments, content provider 140 checks for an I frame at the indicated start time (Block 306). An I frame occurring at the identified start time is likely to indicate that the identified start time is correct. In response to detecting an I frame at indicated start time 204, content provider may continue without editing or replacing ad marker 202.

Various embodiments analyze content 200 to detect an I frame within a predetermined period of the identified start time 204 in response to not detecting an I frame at identified start time 204 (Block 308). The predetermined period may be within 1 second, within ½ seconds, within ¼ seconds, within ⅛ seconds, ¹⁄₁₆ seconds, or any similar period. The term near may also be used to describe proximity in terms of frames. A predetermined number of frames may be used instead of a predetermined period in some embodiments. For example, an I frame may be detected within a predetermined window of 10 frames, 9 frames, 8 frames, 7 frames, 6 frames, 5 frames, 4 frames, 3 frames, 2 frames, or I frame from an identified start time.

An I frame positioned close in time to identified start time 204 rather than precisely at identified start time 204 may signal that the actual start time 206 is at the location of the I frame, and that ad marker 202 includes a slightly mistimed indicated start time 204. In response to detecting an I frame near the indicated start time 204, content provider 140 updates or replaces ad marker 202 to indicate actual start time 206 corresponding to the time the I frame occurs (Block 310). Similar may be performed at indicated end time 205 to determine actual end time 207. Actual end time 207 may be equal to the time that an I frame occurs near indicated end time 205.

Multiple I frames may occasionally be detected near indicated star time 204. Some embodiments may use signature matching to determine which I frame corresponds to actual start time 206. Other embodiments may select the time corresponding to the earliest detected I frame within the predetermined period as being the actual start time. Other embodiments may select the closest I frame to the indicated start time as being the I frame corresponding to the actual start time.

Some embodiments use ad signatures to detect the actual start time 206 and actual end time 207 of an ad. Ad signatures and I frame detection may be used in conjunction as shown in example process 300, though ad signature detection and I frame detection are also used independently in some embodiments.

Content provider 140 checks samples signatures of content 200 to detect signatures of known ads. (Block 312). Content provider 140 may check content 200 at or near ad marker 202 for signatures of known ads. Content provider 140 may check content 200 at or near I frames for signatures of known ads. Content provider 140 may continuously sample content 200 and check for signatures of known ads. Content provider detects ads in content 200 by matching a signature of content 200 to a signature from the signature collection stored in database 130. A signature of content 200 may match a signature from the signature collection in response to both signatures comprising the same or substantially the same frequency magnitude pairs.

In response to detecting a signature of a known ad, content provider 140 may update, create, or replace corresponding ad markers in content 200 (Block 310). The updated, generated, or replaced ad marker 202 may have indicated start time 204 equal to actual start time 206, both of which are equal to the start time of the ad detected by matching signatures. The start time of the ad detected by matching signatures may be determined by selecting the first frame during which the audio-based ad signature appears in content 200. The ad marker 202 may also be written to include identified end time 205 equal to actual end time 207, both of which are equal to the end time of the ad detected by matching signatures.

Content delivery systems of the present disclosure realign ad markers with content when ad markers received from a content origin are out of sync. Realigned ad markers tend to prevent visual artifacts from occurring in rendered content on client devices in response to ad insertion occurring at an incorrect indicated start time. End users thus have a better viewing experience free of mistakenly included frames.

Content delivery systems of the present disclosure also insert ad markers that are missing or stripped during transmission from the content origin to the content provider. Inserted ad markers enable content providers and client devices to replace dated ads or other unwanted content. End users have an improved user experience free from outdated, irrelevant, or uninteresting content. The inserted markers tend to be accurately aligned with the true start and end times of replacement windows, resulting in a user experience free of visual artifacts caused by imprecisely replaced content.

Benefits, other advantages, and solutions to problems have been described herein with regard to specific embodiments. Furthermore, the connecting lines shown in the various figures contained herein are intended to represent examples of functional relationships or couplings between the various elements. It should be noted that many alternative or additional functional relationships or connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used herein, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process, comprising:
   receiving content from a content origin, the content including an original Society of Telecommunications Engineers (SCTE) cue tone that indicates an original start time of an available segment;
   detecting a first I frame occurring in the content at an actual start time that differs from the original start time and is within a predetermined period of the original start time; and
   updating the content to include an updated SCTE cue tone that indicates the actual start time of the available segment.

2. The automated process of claim 1, wherein the predetermined period is within 0.5 seconds of the original start time.

3. The automated process of claim 1, further comprising:
   detecting a second I frame occurring in the content within the predetermined period of the original start time; and
   determining the first I frame corresponds to the actual start time in response to the first I frame occurring before the second I frame in the content.

4. The automated process of claim 1, further comprising:
   detecting a second I frame occurring in the content within the predetermined period of the original start time; and
   determining the first I frame corresponds to the actual start time in response to the first I frame occurring closer to the original start time than the second I frame.

5. The automated process of claim 1, further comprising:
detecting a second I frame occurring in the content within the predetermined period of the original start time;
generating a signature of the content at the time of the first I frame; and
determining the first I frame corresponds to the actual start time in response to the first I frame occurring before the second I frame and in response to the signature of the first I frame matching a signature of a known ad.

6. The automated process of claim 1, further comprising:
generating a plurality of signatures of the content;
checking each signature from the plurality of signatures against a plurality of ad signatures to detect a second start time of a second available segment; and
modifying the content to include a second SCTE cue tone indicating a second available segment beginning at the second start time.

7. The automated process of claim 6, further comprising:
generating the second SCTE cue tone at a server; and
adding the second SCTE cue tone to the content.

8. The automated process of claim 1, further comprising transmitting the content including the updated SCTE cue tone to a client device.

9. An automated process, comprising:
receiving content from a content origin, the content including an original cue tone having an indicated start time;
generating a signature of an ad segment in the content;
comparing the signature of the ad segment with a stored signature to identify an actual start time of the ad segment; and
modifying the content to remove the original cue tone having the indicated start time and add a new cue tone indicating the ad segment is replaceable beginning at the actual start time.

10. The automated process of claim 9, further comprising:
detecting a first I frame occurring in the content at the actual start time within a predetermined period of the indicated start time, wherein the content received from the content origin includes the original cue tone comprising the indicated start time of an available segment; and
updating the original cue tone to set the indicated start time equal to the actual start time.

11. The automated process of claim 10, wherein the predetermined period is within 0.5 seconds of the indicated start time.

12. The automated process of claim 10, further comprising:
detecting a second I frame occurring in the content within the predetermined period of the indicated start time; and
determining the first I frame corresponds to the actual start time in response to the first I frame occurring before the second I frame in the content.

13. The automated process of claim 9, further comprising:
generating the new cue tone at a server; and
adding the new cue tone to the content.

14. The automated process of claim 9, wherein the new cue tone comprises an SCTE cue.

15. The automated process of claim 9, further comprising transmitting the content including the new cue tone to a client device.

16. A server comprising a processor in communication with a non-transitory memory configured to store instructions that, when executed by the processor, cause the processor to perform operations, the operations comprising:
receiving content from a content origin, the content including an original Society of Telecommunications Engineers (SCTE) cue comprising an indicated start time of an available segment;
detecting a first I frame occurring in the content at an actual start time within a predetermined period of the indicated start time; and
updating the content by removing the original SCTE cue with the indicated start time and adding a new SCTE cue including the actual start time.

17. The server of claim 16, wherein the predetermined period is within 0.5 seconds of the indicated start time.

18. The server of claim 16, wherein the operations further comprise:
generating a plurality of signatures of the content;
checking each signature from the plurality of signatures against a plurality of ad signatures to detect a second actual start time of a second available segment; and
modifying the content to include a second SCTE cue indicating a second available segment beginning at the second actual start time.

19. The server of claim 18, wherein modifying the content to include the second SCTE cue further includes generating the second SCTE cue and adding the second SCTE cue to the content.

20. The server of claim 16, wherein the operations further comprise transmitting the content including the new SCTE cue to a client device.

\* \* \* \* \*